United States Patent [19]

De Jong et al.

[11] 4,190,462
[45] Feb. 26, 1980

[54] DISSOLVING BARIUM SULFATE SCALE WITH AQUEOUS SOLUTIONS OF SALTS OF CARBOXYMETHYL MONOCYCLIC MACROCYCLIC POLYAMINES

[75] Inventors: Reike De Jong; Gerridina J. Torny-Schutte; David N. Reinhoudt, all of Amsterdam, Netherlands

[73] Assignee: Shell Oil Company, Houston, Tex.

[21] Appl. No.: 3,155

[22] Filed: Jan. 15, 1979

[30] Foreign Application Priority Data

Jul. 4, 1978 [GB] United Kingdom ............... 28757/78

[51] Int. Cl.$^2$ ............................................. B08B 3/08
[52] U.S. Cl. ......................................... 134/2; 134/42; 252/8.55 B; 252/82
[58] Field of Search ................ 134/2, 22 R, 22 C, 42; 252/8.55 B, 82; 260/327 R, 333, 338, 239 BC; 166/312

[56] References Cited

U.S. PATENT DOCUMENTS

| | | | |
|---|---|---|---|
| 3,531,468 | 9/1970 | Park et al. | 260/239 BC |
| 3,888,877 | 6/1975 | Lehn | 260/327 R |
| 3,966,766 | 6/1976 | Lehn | 260/327 R |
| 4,001,212 | 1/1977 | Richman | 260/239 BC |
| 4,030,548 | 6/1977 | Richardson et al. | 134/2 X |

OTHER PUBLICATIONS

Dietrich et al., Tetrahedron Letters, 1969, pp. 2889–2892.

Primary Examiner—Marc L. Caroff

[57] ABSTRACT

Barium sulfate scale can be removed from remote locations such as those in or around the borehole of a well extending into a subterranean earth formation by contacting the scale with an aqueous solution consisting essentially of water, a monovalent cation salt of a monocyclic macrocyclic polyamine containing at least two nitrogen-linked carboxymethyl groups and enough monovalent basic compound to provide a solution pH of about 8.

5 Claims, No Drawings

DISSOLVING BARIUM SULFATE SCALE WITH AQUEOUS SOLUTIONS OF SALTS OF CARBOXYMETHYL MONOCYCLIC MACROCYCLIC POLYAMINES

BACKGROUND OF THE INVENTION

The invention relates to dissolving barium sulfate solids from locations in and around the boreholes of wells and/or other relatively remote locations into which a fluid can be flowed.

Various well treating procedures for removing various types of scales with aminopolyacetic acid salt chelating agents, such as EDTA (ethylenediaminetetraacetic acid), are known. For example, U.S. Pat. No. 2,396,938 (filed in 1944) describes removing boiler scale with aqueous solutions of such a chelant and an alakali metal hydroxide. U.S. Pat. No. 2,802,788 (filed in 1952) describes a radiator cleaning composition in which such a chelant salt is included in an aqueous solution along with an inorganic chelant, e.g., sodium tripolyphosphate. U.S. Pat. No. 3,308,065 (filed in 1963) describes a substantially one-pore volume treatment for removing calcium sulfate-containing scale with an ammoniated or aminated chelant, e.g., an ammonium salt of EDTA. U.S. Pat. No. 3,660,287 (filed in 1967) describes a similar treatment for dissolving calcium sulfate-containing scale with a mixture of an EDTA salt and water soluble inorganic carbonate salt. While the above processes were consistent in utilizing an amount of solution which about filled one pore volume of the region within which the scale was to be removed and using a concentration of chelant such that that volume of the solution contained a stoichiometric excess relative to the amount of scale to be dissolved, U.S. Pat. Nos. 2,877,848 and 4,030,548 relate to using relatively dilute solutions. The U.S. Pat. No. 4,030,548 patent describes the tendancy for relatively concentrated EDTA solutions to become quickly saturated with a Ba-EDTA complex and suggests a once-through-dynamic wash treatment with enough solution to gradually remove the solid.

Numerous monocyclic and bicyclic macrocyclic polyethers and their tendancies to chelate with alkaline earth metals and to dissolve salts of such metals are disclosed in "Tetrahedron Letters" No. 34 (1969), pages 2889–2892. U.S. Pat. Nos. 3,888,877 and 3,966,766 relate to such polyethers and their general utility as chelating agents.

Our co-pending patent application Ser. No. 951,701, filed Oct. 16, 1978, relates to dissolving a barium sulfate solid from a remote location into which fluid can be flowed by contacting that solid with an aqueous solution consisting essentially of: water, a bicyclic macrocyclic polyether, a proportion of alkali metal salt of an organic acid which is less than that of the polyether but is sufficient to catalytically increase the rate of barium solid dissolving by the polyether, and enough dissolved alkaline inorganic alkali metal or ammonium compound to provide a solution pH of at least about 8.

SUMMARY OF THE INVENTION

The present invention relates to a process for cleaning scale-coated surfaces in or around the borehole of a well into which fluid can be flowed. The process comprises contacting the surfaces to be cleaned with an aqueous solution consisting essentially of water, a monovalent cation salt of a monocyclic macrocyclic polyether containing at least two nitrogen-linked carboxymethul groups and enough dissolved alkaline inorganic alkali metal or ammonium compound to provide a solution pH of at least about 8. The polyether contains an intra-molecular cavity or crypt which is selectively receptive to multivalent cations. And, the aqueous solution is both capable of relatively rapidly dissolving barium sulfate scale and free of any bicyclic macrocyclic polyether.

DESCRIPTION OF THE INVENTION

Our prior application involved a discovery that in an alkaline aqueous solution, a bicyclic macrocyclic polyether can cooperate with a salt of an organic acid in a manner such that the rate at which solid barium sulfate is dissolved is greatly increased without altering the capacity for dissolving relatively large amounts of barium sulfate that is exhibited by such a polyether in an alkaline aqueous solution containing none of the salt of the organic acid. Our present invention is at least in part premised on a discovery that the specified salts of the above-defined carboxymethyl group-containing monocyclic polyethers are, unobviously, capable of providing both an economically feasible, relatively rapid and relatively extensive dissolving of solid barium sulfates in alkaline aqueous solutions which are free of any bicyclic macrocyclic polyether.

In general, the monocyclic macrocyclic polyethers used in the present invention, which may alternatively be described as monocyclic macrocyclic polyamines, have the general formula:

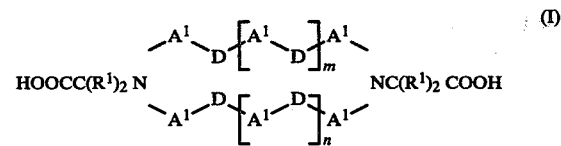

wherein each $A^1$ represents a hydrocarbon radical having up to 12 carbon atoms and each D represents an oxygen or a sulphur atom or a hydrocarbon radical having up to 12 carbon atoms, or a group of the formula, $NR^2$, (where $R^2$ represents a hydrogen atom or a hydrocarbon radical having up to 12 carbon atoms, a hydrocarbonsulfonyl radical having up to 12 carbon atoms, an alkoxycarbonyl radical having fewer than 5 carbon atoms, an alkoxycarbonyl-methylene radical having fewer than 5 carbon atoms or a carboxymethylene radical), at least two of the said D members being an oxygen or a sulphur atom or group of the formula, $NR^2$, and each $R^1$ represents an alkyl group having up to 6 carbon atoms or a hydrogen atom and m and n are integers from 0 to 5 inclusive.

Unobviously, if the nitrogen-linked carboxymethyl groups shown in formula I are replaced by carboxyethyl groups (so that the carboxyl groups are two carbon atoms removed from the nitrogen atoms) or if the nitrogen-linked carboxymethyl groups of formula I are replaced by hydrogen atoms (so that the polyether is an amine rather than an acid) the resulting polyethers have only a relatively very low capacity for dissolving solid barium sulfate.

In general, the symbol $A^1$ in formula I preferably represents a hydrocarbon radical having in the range of from 2 to 8 carbon atoms, such as ethylene, diethylene, triethylene, tetraethylene 1,2-phenylene and the like radicals; with an ethylene radical being particularly preferred. The integers m and n are preferably in the range of from 1 to 3. The hydrocarbon radical $R^2$ may represent is preferably an alkyl group with 1 to 8, particularly 1 to 4 carbon atoms. The hydrocarbonsulfonyl radical $R^2$ may represent has preferably 1 to 8 and more preferably 1 to 4 carbon atoms. The alkoxycarbonyl radical $R^2$ may represent is preferably a methoxycarbonyl or an ethoxycarbonyl radical. Methyl and ethyl groups are preferred among the alkyl groups $R^1$ may represent.

A particularly preferred compound of formula I is 1,10-di(carboxymethyl)-1,10-diaza-4,7,13,16-tet-raococycloctadecane; this compound, "compound A", having the structure:

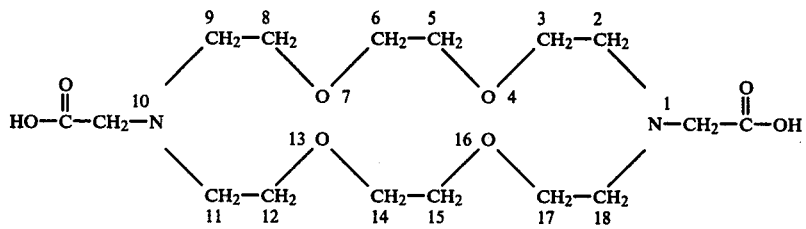

The pH of the aqueous solution containing the salt of a compound of formula I must be at least 8, because protonation of such a macocyclic polyether reduces the tendency for the polyether to form barium complexes. The higher pH increases above 8 the higher will be the concentration of the unprotonated portion of the macrocyclic polyether and, consequently, the higher will be the extent to which this macrocyclic polyether can be loaded up with barium ions. In view of this, the aqueous solution preferably has a pH of at least 10.0, and particularly a pH in the range of from 10.0 to 11.5. The solution pH can be increased by incorporating a base into the aqueous composition, preferably a base containing a monovalent cation which is hardly compatible, if at all, with the macrocyclic polyether (i.e., has little or no tendency to be chelated by the polyether), such as an alkaline inorganic alkali metal or ammonium compound. Lithium hydroxide is a particularly suitable base.

The cation of the salt of the carboxymethyl polyethers, of formula I, present in the present aqueous solutions may be substantially any monovalent cation, for example, a lithium, sodium, potassium or ammonium ion. This cation is preferably similarly incompatible with the macrocyclic polyether of formula I.

The aqueous solution used in the present invention may contain well-treating or cleaning solution additives which are compatible with the components of that solution. Such additives include, for example, surfactant materials, which may be ionic or nonionic. Examples of suitable surfactants are alkali metal salts of alkyl aryl sulphonates such as sodium dodecylbenzene sulfonate, alkali metal salts of sulphates of fatty alcohols such as sodium lauryl sulphate and materials having a polyoxyethylene chain. The surfactant material may be present in the solution in a concentration in the range of from, for example, 1 to 3 percent by weight. Such additives may also include compatible chelating agents such as monovalent cation salts of polyamino polycarboxylic acids typified by the sodium salts of polyethylene diaminetetracedic acid (EDTA). Such chelating agents are preferably used in proportions of less than those of the salts of polyethers of the formula I. They are particularly useful for cleaning surfaces coated with scales containing calcium or magnesium ions in addition to barium sulfate scale.

The contact time for dissolving the barium sulphate solid with the present aqueous solutions will vary not only with the temperature but also with the relative proportions of the constituents. In general, the contact time should be in the range of from about 1 minute to 3 hours; for example, from 5 minutes to 1.5 hours.

The present aqueous solutions can be used for dissolving barium sulphate solid, substantially the ambient temperature. Temperatures as low as 10° to 20° C. have been found satisfactory. However, the relatively high temperature (say 30°-70° C. or higher) prevailing in an oil producing formation into which a production well penetrates, greatly enhances the rate of dissolution of the solid.

The salts of the macrocyclic polyethers of the general formula I may be prepared in a manner known per se by reacting the corresponding macrocyclic polyether of the general formula:

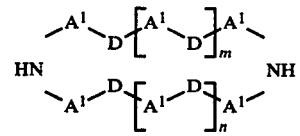

with a salt of 2-chloroacetic acid or 2-bromoacetic acid in the presence of a base. Examples of salts of 2-chloroacetic acid and 2-bromoacetic acid are alkali metal salts. Suitable bases are alkali metal hydroxides, for example sodium hydroxide and potassium hydroxide. Acidification of the reaction solution yields the macrocyclic polyethers of the general formula I.

The barium sulphate scale-dissolving capacities of several aqueous compositions have been demonstrated in the laboratory tests described in the following Examples.

The experiments described below were carried out in a cylindrical glass vessel having a height of 2.5 cm and an internal diameter of 0.8 cm and containing five stainless-steel balls with a diameter of 0.32 cm. The vessel was charged with the starting materials and then fixed lengthwise to a horizontal shaft parallel to its central axis. The shaft was rotating at a speed of 180 revolutions per minute. The temperature of the vessel was 20° C.

EXAMPLE I

The vessel was charged with barium sulphate (0.5 mmol), water (1 ml), compound A (0.1 mmol) and enough lithium hydroxide to provide an aqueous solution pH of 11. After 24 hours of rotation the suspension was allowed to separate by settling. A sample of the aqueous liquid layer contained dissolved barium and dissolved sulphate, both in amounts of 15.2 g/l, calculated as barium sulphate. Hence, the lithium salt of compound A had been used with an efficiency of $15.2/233 \times 0.1 \times 100 = 65\%$.

Comparative Experiment A

This experiment differed from Example I in that compound A was replaced by 1,10-diaza-4,7,13,16-tetraoxacyclooctadecane, in which the carboxymethyl groups were replaced by hydrogen atoms. The sample drawn from the aqueous layer contained dissolved barium and dissolved sulphate, both in amounts of 0.09 g/l, calculated as barium sulphate. Hence, the 1,10-diaza-4,7,13,16-tetraoxacyclooctadecane had been used with an efficiency of $0.09/233 \times 0.1 \times 100$ or only 0.4%.

Comparative Experiment B

This experiment differed from Example I in that compound A was replaced by 1,10-di(2-carboxyethyl)-1,10-diaza-4,7,13,16-tetraoxacyclooctadecane, in which the carboxyl groups were 2 carbon atoms removed from the nitrogen atoms. The sample drawn from the aqueous layer contained dissolved barium and dissolved sulphate in amounts of 0.033 and 1.4 g/l, respectively, calculated as barium sulphate, indicating that most of the complexed barium was present in the vessel as a solid. Hence, the 1,10-di(2-carboxyethyl)-1,10-diaza-4,7,13,16-tetraoxacyclooctadecane had been used with an efficiency of $1.43/233 \times 0.1 \times 100$ or only 6.1%.

EXAMPLE II

The vessel was charged with barium sulphate (0.3 mmol), water (1 ml), compound A (0.1 mmol) and enough lithium hydroxide so that the aqueous solution in the vessel had a pH of 11. After 15 minutes of rotation the suspension was allowed to separate by settling. A sample drawn from the aqueous layer contained dissolved barium and dissolved sulphate, both in amounts of 14.5 g/l, calculated as barium sulphate. Hence, the lithium salt of compound A had been used with an efficiency of $14.5/233 \times 0.1 \times 100$ or 62%. This efficiency remained constant after prolonged rotation.

EXAMPLE III

The vessel was charged with water (1 ml), natural barite (430 mg, grain size 4 mm) and compound A (0.37 mmol). Then, so much potassium hydroxide was added that the pH of the aqueous liquid reached a value of 11. The natural barite contained the following compounds:

| Compound | % w | Compound | % w |
|---|---|---|---|
| BaSO$_4$ | 80 | Fe$_2$O$_3$ | 3 |
| SiO$_2$ | 13 | SrSO$_4$ | 2 |

Hence, 1.5 mmol of barium sulphate was present in the flask. After 90 hours' rotation the aqueous liquid contained dissolved barium sulphate in a concentration of 0.104 M. Hence, compound A had been used with an efficiency of $0.104/0.37 \times 100 = 28\%$.

In the cleaning and descaling process of the invention, an aqueous cleaning solution which is capable of dissolving barium sulphate is flowed into contact with the surfaces to be cleaned for a time long enough to remove at least a portion of the barium sulphate scale from said surfaces. The cleaning solution may be circulated over or along the surfaces to be cleaned. When cleaning equipment in a well, the cleaning solution may be circulated through the tubular goods in the well, such as by being pumped down through the production tube and being returned to the surface through the annular space between the production tubes and the casing (or vice versa). Also, the cleaning solution may be pumped down through the production tubing and into the formation, thereby cleaning the well and the formation pore space by dissolving barium sulphate present therein whilst flowing over and along the surfaces that need cleaning. The spent composition of such once-through-dynamic wash procedure can be subsequently returned to the surface; for example, by displacement or entrainment with the fluids that are produced through the well after the cleaning operation. In an alternative manner, the cleaning solution may be applied batchwise fashion. For example, by flowing the solution into the well and optionally into the pore spaces of the adjacent earth formation and there keeping the solution in contact in non-flowing condition with the surfaces that are covered with barium sulfate scale, during a period of time sufficient to dissolve at least a considerable part of said scale.

What is claimed is:

1. A process for removing barium sulfate scale from fluid-contactable surfaces in a location into which fluid can be flowed which comprises;

flowing into contact with said surfaces an aqueous solution consisting essentially of water, an effective complexing amount of a monovalent cation salt of a monocyclic macrocyclic polyamine containing at least two nitrogen-linked carboxymethyl groups and enough dissolved monovalent basic compound to provide a solution pH of at least about 8;

said polyamine having an intra-molecular cavity or crypt which is selectively receitive to multivalent cations; and, said aqueous solution being both capable of relatively rapidly and extensively dissolving solid barium sulfate and free of any bicyclic macrocyclic polyether.

2. The process of claim 1 in which said polyamine has the formula:

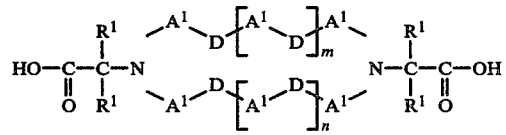

wherein each $A^1$ represents a hydrocarbon radical having up to 12 carbon atoms and each D represents an oxygen or a sulphur atom or a hydrocarbon radical having up to 12 carbon atoms or a group of the formula $=N-R^2$ (where $R^2$ represents a hydrogen atom or a hydrocarbon radical having up to 12 carbon atoms, a hydrocarbonsulfonyl radical having up to 12 carbon atoms, an alkoxycarbonyl radical having fewer than 5 carbon atoms, an alkoxycarbonyl-methylene radical having fewer than 5 carbon atoms or a carboxymethylene radical), at least two of the said D members being an oxygen or a sulphur atom or groups of the formula $=N-R^2$, and each $R^1$ represents an alkyl group having up to 6 carbon atoms or a hydrogen atom, and m and n are integers from 0 to 5 inclusive.

3. The process of claim 2 in which $A^1$ represents a hydrocarbon radical containing from about 2 to 8 carbon atoms and the integers m and n have values of from 1 to 3.

4. The process of claim 1 in which said polyamine is 1,10-di(carboxymethyl)-1,10-diaza-4,7,13,16-tetraoxocyclooctadecane.

5. The process of claim 4 in which said polyamine salt is mixed with a lesser proportion of a monovalent cation salt of a polyamino polyacetic acid.

* * * * *